Feb. 1, 1955 D. W. MOLINS 2,701,070

CIGARETTE TRAY DUMPING DEVICE

Filed Feb. 25, 1952 9 Sheets-Sheet 1

INVENTOR
Desmond W. Molins
BY
Watson, Cole, Grindle & Watson
ATTORNEYS

Feb. 1, 1955 D. W. MOLINS 2,701,070

CIGARETTE TRAY DUMPING DEVICE

Filed Feb. 25, 1952 9 Sheets-Sheet 2

INVENTOR
Desmond W. Molins
BY
Watson, Cole, Grindle & Watson
ATTORNEYS

CIGARETTE TRAY DUMPING DEVICE

Filed Feb. 25, 1952 9 Sheets-Sheet 3

INVENTOR
Desmond W. Molins
BY
Watson, Cole, Grindle & Watson
ATTORNEYS

Feb. 1, 1955 D. W. MOLINS 2,701,070

CIGARETTE TRAY DUMPING DEVICE

Filed Feb. 25, 1952 9 Sheets-Sheet 4

INVENTOR
Desmond W. Molins
BY Watson, Cole, Grindle & Watson
ATTORNEYS

INVENTOR
Desmond W. Molins
BY Watson, Cole, Grindle & Watson
ATTORNEYS

Feb. 1, 1955 D. W. MOLINS 2,701,070

CIGARETTE TRAY DUMPING DEVICE

Filed Feb. 25, 1952 9 Sheets-Sheet 6

INVENTOR
Desmond W. Molins
BY Watson, Cole,
Grindle & Watson
ATTORNEYS

INVENTOR
Desmond W. Molins
BY Watson, Cole,
Grindle & Watson
ATTORNEYS

Feb. 1, 1955 D. W. MOLINS 2,701,070

CIGARETTE TRAY DUMPING DEVICE

Filed Feb. 25, 1952 9 Sheets-Sheet 8

INVENTOR
Desmond W. Molins
BY Watson, Cole, Grindle & Watson
ATTORNEYS

Feb. 1, 1955 D. W. MOLINS 2,701,070

CIGARETTE TRAY DUMPING DEVICE

Filed Feb. 25, 1952 9 Sheets-Sheet 9

INVENTOR
DESMOND W. MOLINS

BY Watson, Cole, Grindle & Watson
ATTORNEYS 2,701,070
Patented Feb. 1, 1955

2,701,070

CIGARETTE TRAY DUMPING DEVICE

Desmond Walter Molins, Deptford, London, England, assignor to Molins Machine Company Limited, London, England, a British company Application February 25, 1952, Serial No. 273,185

Claims priority, application Great Britain March 1, 1951

6 Claims. (Cl. 214—301)

This invention concerns improvements in or relating to the packing or handling of cigarettes or other rod shaped articles.

In United States Patent No. 2,605,909 there is described apparatus for discharging the contents of cigarette trays into the hopper of a cigarette packing machine. In that apparatus a charger is swung to and fro on a pivot and carries a tray of cigarettes to a hopper where the tray discharges its contents and, as the cigarettes are moving into the hopper, the charger begins to move away from the hopper. The charger is operated by a crank motion, so although its movement near the end of each swing is comparatively slow it is nevertheless in continuous movement, except for an instant at the dead centres. The cigarettes passing out of the tray into the hopper are guided by guides which also serve to support the mass of cigarettes discharged from the tray while they are being absorbed by the hopper. If, however, the hopper is fairly full when a tray arrives for discharge, the tray can sometimes return, still containing some cigarettes. It is an object of the invention to overcome this defect. In other arrangements of a similar nature it is necessary to provide a side guide for cigarettes when they are discharged from a tray but as this guide would be in the way of the loaded tray when it moves over towards the discharging position means is provided to collapse the guide temporarily and to restore it to its normal position when the loaded tray has passed it. The trays have slots in their sides as in the tray filling operation a guide is used to direct cigarettes into the trays as the latter pass slowly along past a filling station.

According to the present invention there is provided apparatus of the kind referred to wherein the guide near the charger pivot is formed by a pivoted member adapted to bend and permit a loaded tray to pass on its way to the hopper whereafter the guide straightens so as to constitute a guide for cigarettes discharged from the tray and is thereafter held erect until the charger movements are repeated. On the return movement of the charger the guide passes through the aforesaid slot in the side of the tray. The guide member may comprise two or more parts hinged together and in one construction these are normally held in a substantially straight line by springs and stops which are so arranged that the parts of the guide may be bent in one direction about the hinge pivots against the influence of the springs. In another construction the guide is collapsed and straightened by suitable mechanism.

The invention will be more fully described with reference to the accompanying drawings in which.

Figure 1:
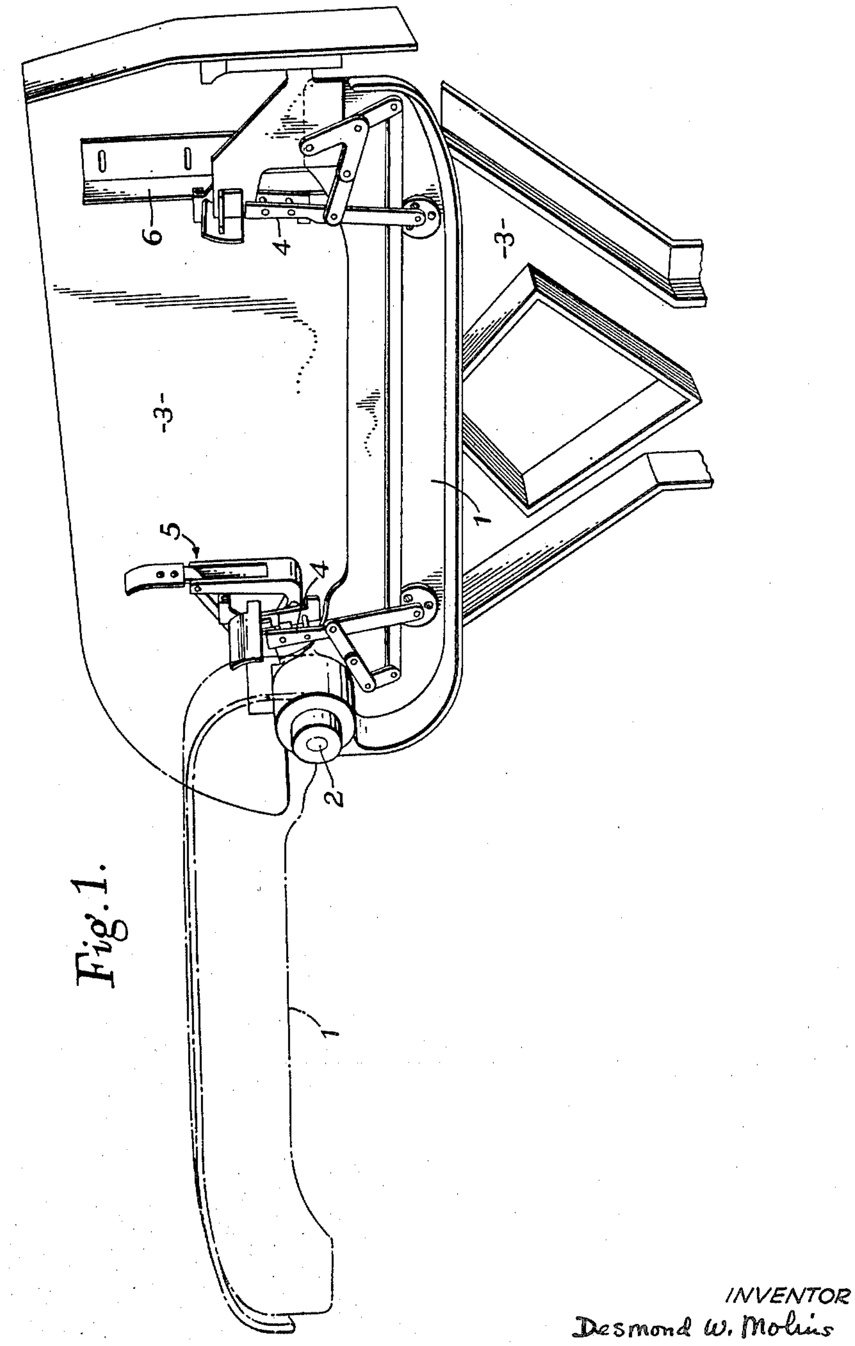
Figure 1 is a diagrammatic perspective of one form of discharging apparatus.
Figure 7:
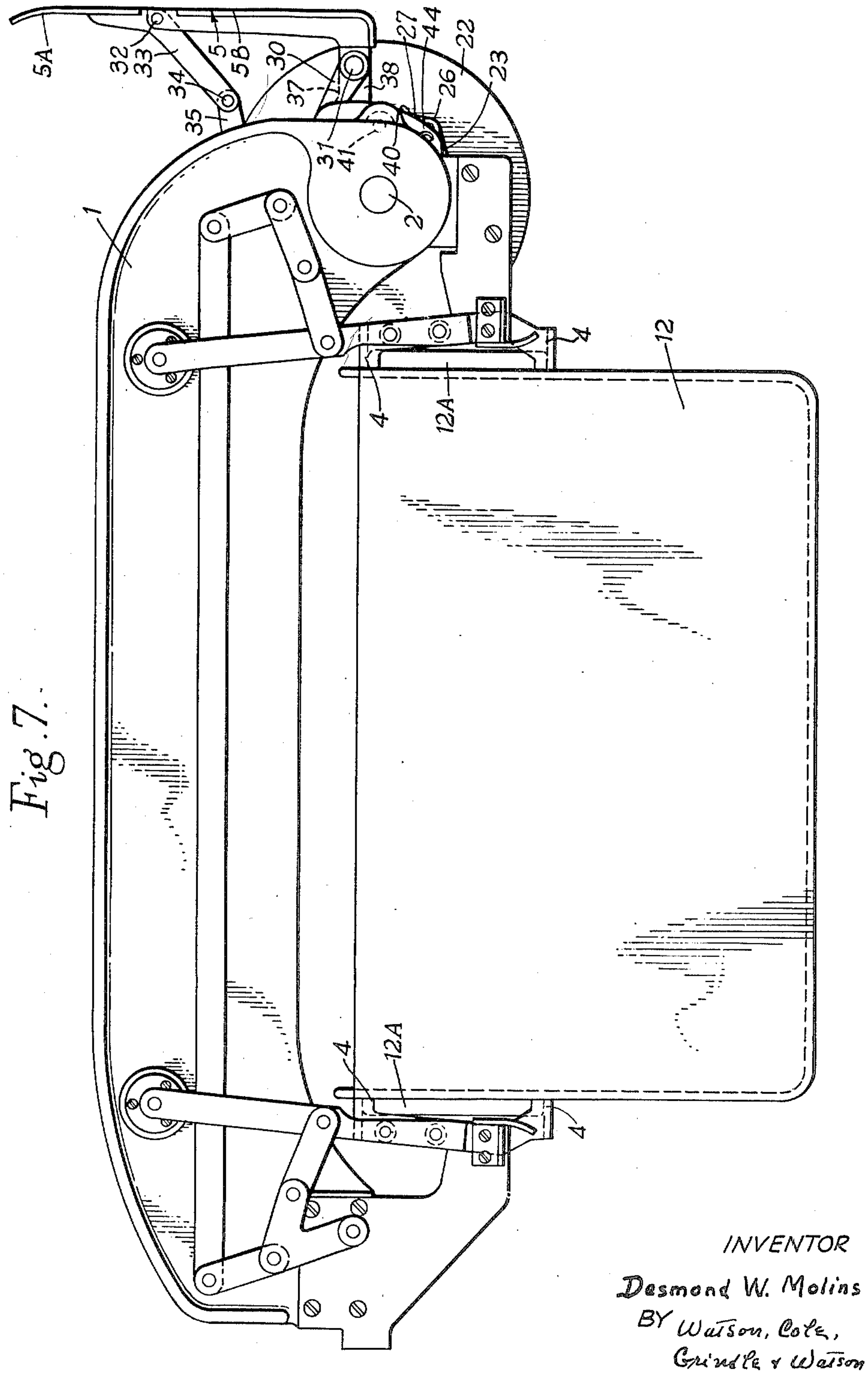
Figure 7 is a front elevation of an arm shown in Figure 1 and includes a collapsible guide and a tray held by grippers attached to the arm.
Figure 8:
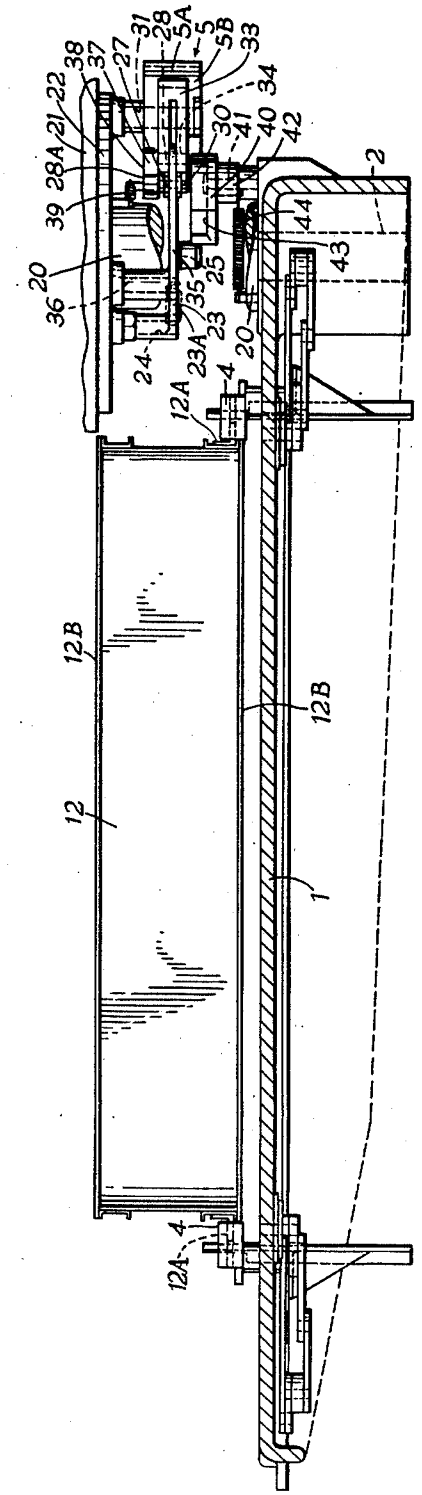
Figure 8 is a plan of Figure 7, partly in section.
Figure 12:
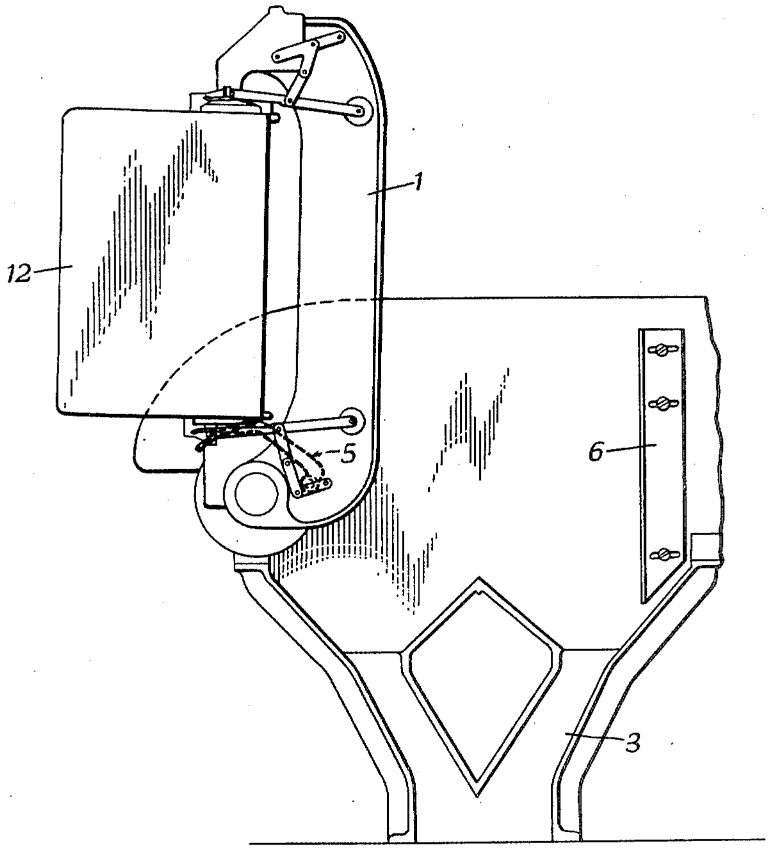
Figures 12, 13 and 14 are views similar to Figure 7, the positions shown of the arm and tray and guide corresponding respectively to the three positions of the parts in Figures 9, 10 and 11.
Figure 13:
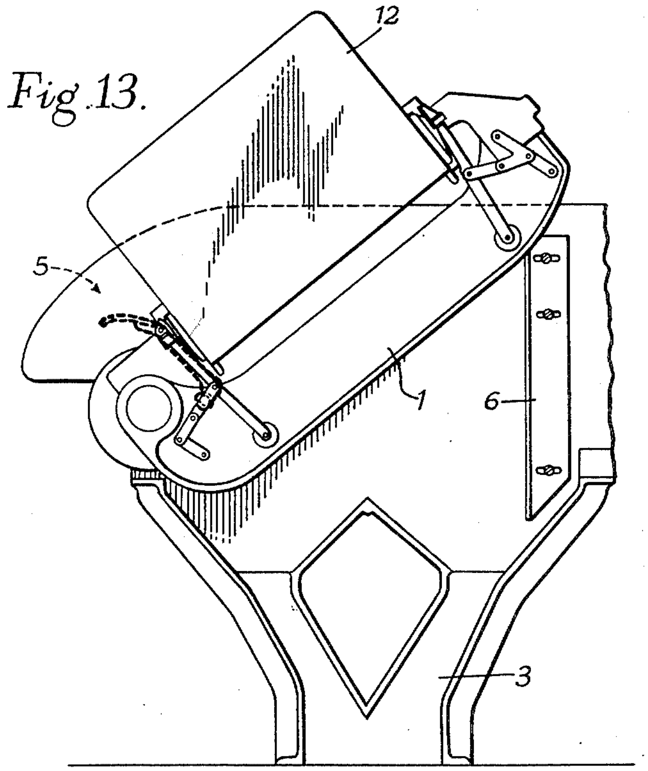
Figure 14:
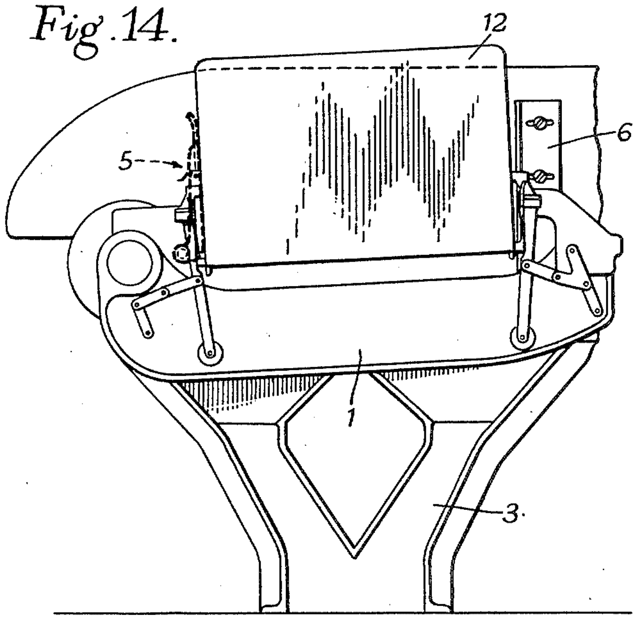
Figure 15:
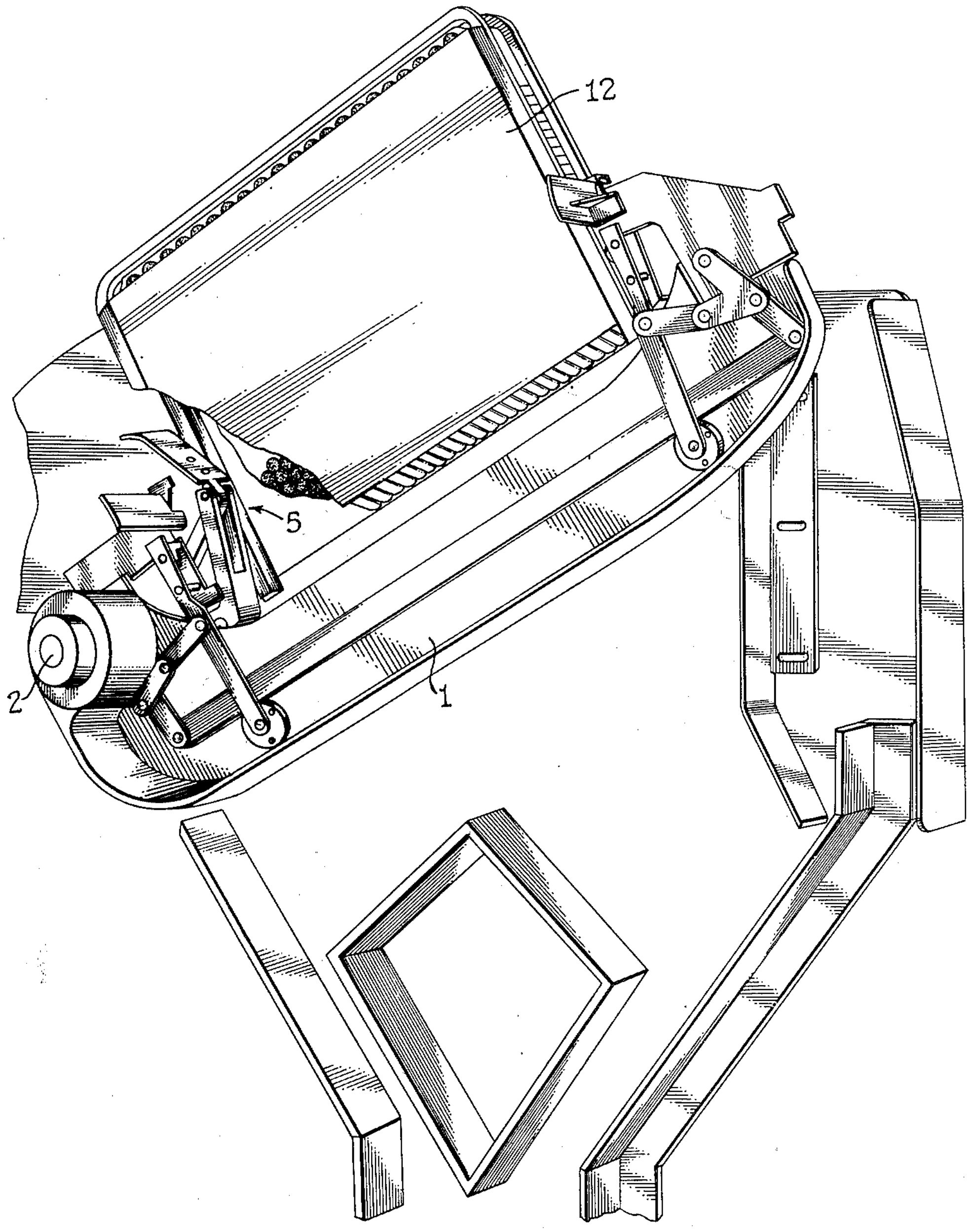
Figure 15 is a perspective view showing the arm and tray substantially in the position shown in Figure 13, the tray being broken away to show the collapsible guide more clearly.

Referring first to Figure 1 there is shown an arm 1 pivoted at 2 and movable through a semi-circular path from the position shown in chain lines to the full line position and back again. At the chain line position the arm seizes a tray (not shown) filled with cigarettes and at the full line position the cigarettes fall into a hopper 3 which is part of a cigarette packing machine. The tray is gripped by grippers 4, attached to the arm 1 and suitably operated to grip and release trays. On Figure 1 there is also shown a collapsible guide generally indicated by the reference 5 and a fixed guide 6. These guides control the cigarettes when they are discharged from the tray. The operation of the apparatus will be better understood by reference to Figures 7, 8, 12, 13 and 14. From Figure 8 it will be seen that the grippers 4 engage lugs 12A of a tray 12 and that the tray is supported to the rear of the arm. The trays shown have side plates 12B but many trays do not have these plates. A tray is gripped as shown in Figure 7 and then the arm 1 rotates through 180°. Figures 12, 13, 14 show the arm in three positions, namely at 92°, 142° and 177° respectively from the position shown in Figure 7. There is no special significance in these angles; they merely correspond to three angular displacements of a cam shown in Figures 9, 10 and 11 as will be described later.

Figures 2, 3, 4:
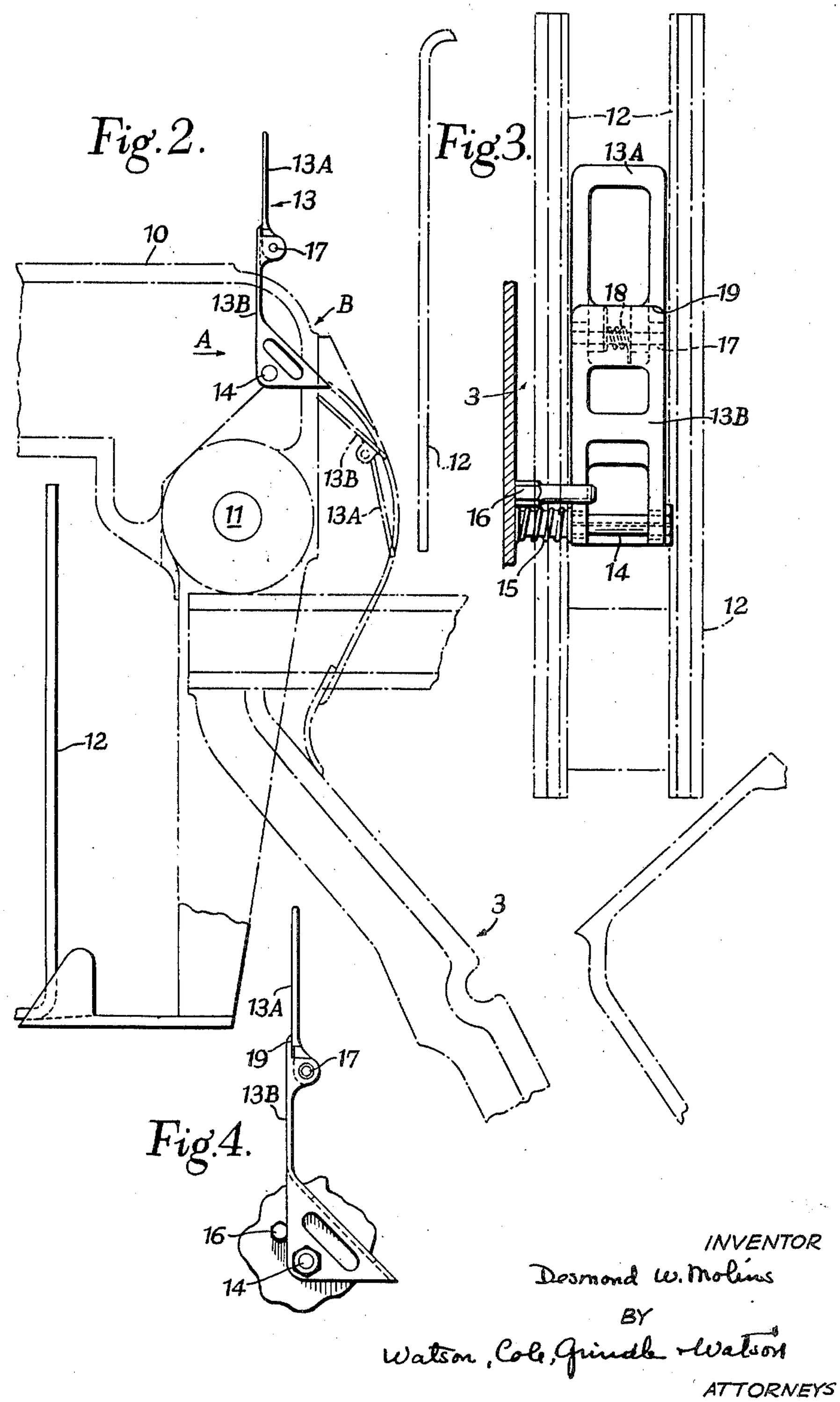
Figure 2 is a front elevation of part of a discharging apparatus of a kind slightly different from that shown in Figure 1.
Figure 3 is a view of part of Figure 2 looking in the direction of the arrow A.
Figure 4 is a guide shown in Figure 2 but drawn to a larger scale.

Referring now to Figure 2 part of an arm generally similar to the arm 1 of Figure 1 is shown and bears the reference 10. This arm is pivoted at 11 and moves as above described. A tray, part of which is shown at 12 is seized by the arm and swung over to the discharge position where it is shown in chain lines. As the tray is full of cigarettes it cannot pass by a collapsible guide, generally indicated by the reference 13, which lies in its path while the guide is in the position shown in Figure 2. This guide is behind the charger arm 1 so the latter is mainly shown in chain lines while the guide is in full lines.

The guide 13 is pivoted and sprung so that normally it stands erect on a pivot 14 at its base where a torsion spring 15 and stop 16, Figures 3 and 4, are provided. The guide is formed of two parts and the upper part 13A is pivoted to the lower part 13B at 17 and this pivot also comprises a torsion spring 18 and a stop 19, Figure 3. The stops keep the two parts erect as they are urged against the stops by the springs. As the tray swings over to the discharge position the guide parts are bent round in turn on their pivots and against the influence of the springs by the cigarettes at the neighbouring corner of the tray but at a later stage of the movement the guide parts escape from contact with the cigarettes and once more assume the erect position so as to constitute a guide for the falling cigarettes. On the return movement the guide stays erect, being unable to bend in the reverse direction because of the stops, and enters the neighbouring slot in the side of the tray and causes any remaining cigarettes to be pushed out of the tray as the latter moves past the guide.

Figures 5, 6:
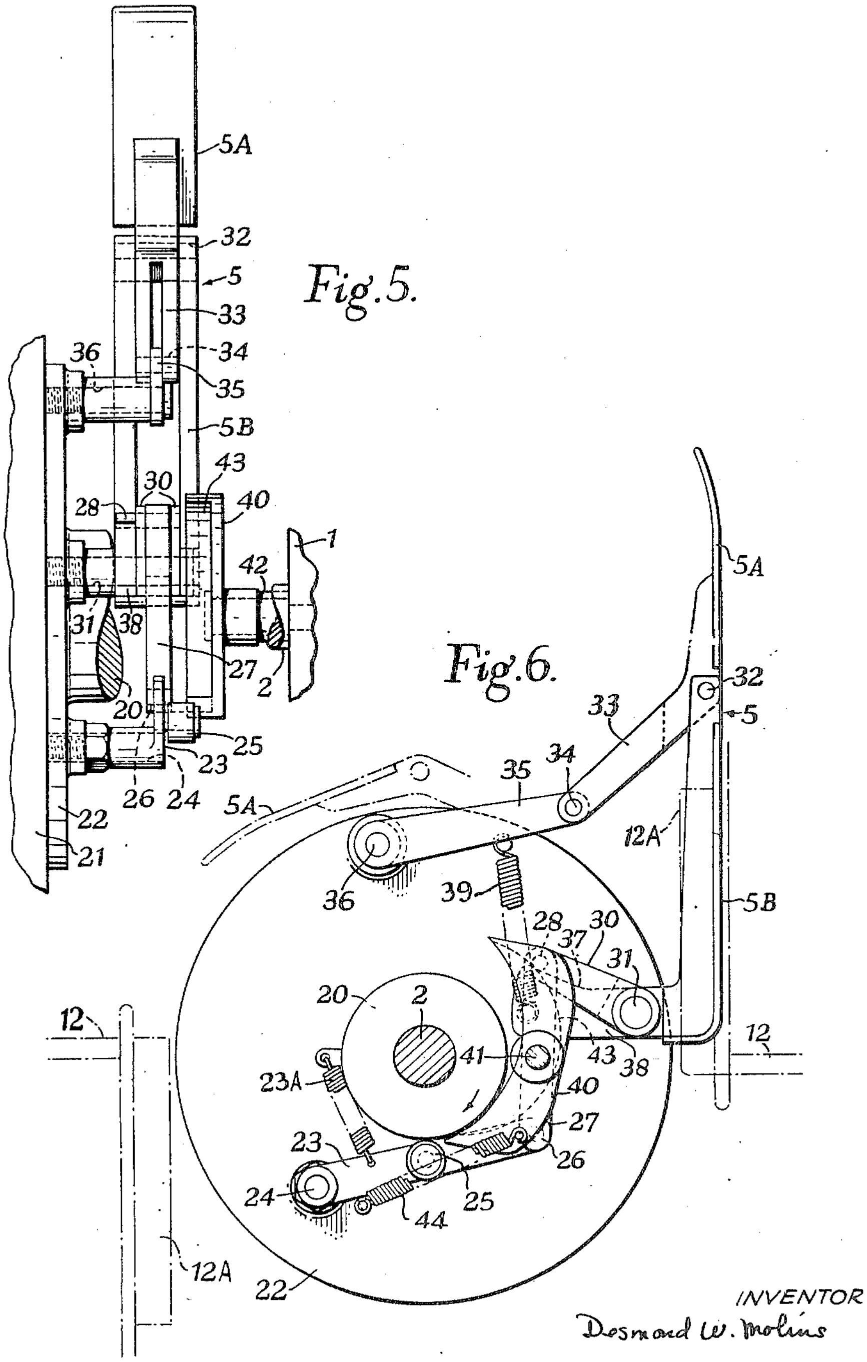
Figure 5 is a side elevation of operating mechanism for the guide shown in the construction illustrated in Figure 1.
Figure 6 is a front elevation of Figure 5.

In the arrangement shown in Figures 1, 5 and 6 the collapsible guide 5 is bent over by a cam device in the following manner: The arm 1 is pivoted on the shaft 2 which is journalled in a boss 20 extending from the fixed frame 21 of the apparatus. On a disc 22 from which the boss extends is a lever 23 pivoted at 24 and having a cam roller 25 on it. The free end of the lever 23 is pivoted at 26 to a link 27 whose upper end is pivoted at 28 to a lever 30 pivoted at 31. This pivot 31, which is fixed in position, is also the pivot of the collapsible guide 5.

When the lever 23 is oscillated on its pivot 24, as explained later, the guide 5 will also swing on its pivot 31. The guide comprises upper and lower members 5A and 5B hinged at 32 and to an arm 33 fixed to the upper member 5A there is pivoted at 34 a lever 35 pivoted on a fixed pivot at 36, the parts being arranged so that lever 35 and arm 33 form an elbow as shown. When the guide 5 moves anticlockwise on its pivot 31, see Figure 6, the elbow will bend more sharply and eventually the part 5A of the guide assumes the position shown in chain lines in Figure 6. The lever 30 has a pin 28A on it which is an extension of the pivot 28, Figure 5, and which engages a surface 37 of an extension 38 beyond the pivot 31 of the lower member 5B of the guide. A spring 39 pulls the guide to the full line position in Figure 6 and also keeps the surface 37 against the pin 28A.

Figures 9, 10, 11:
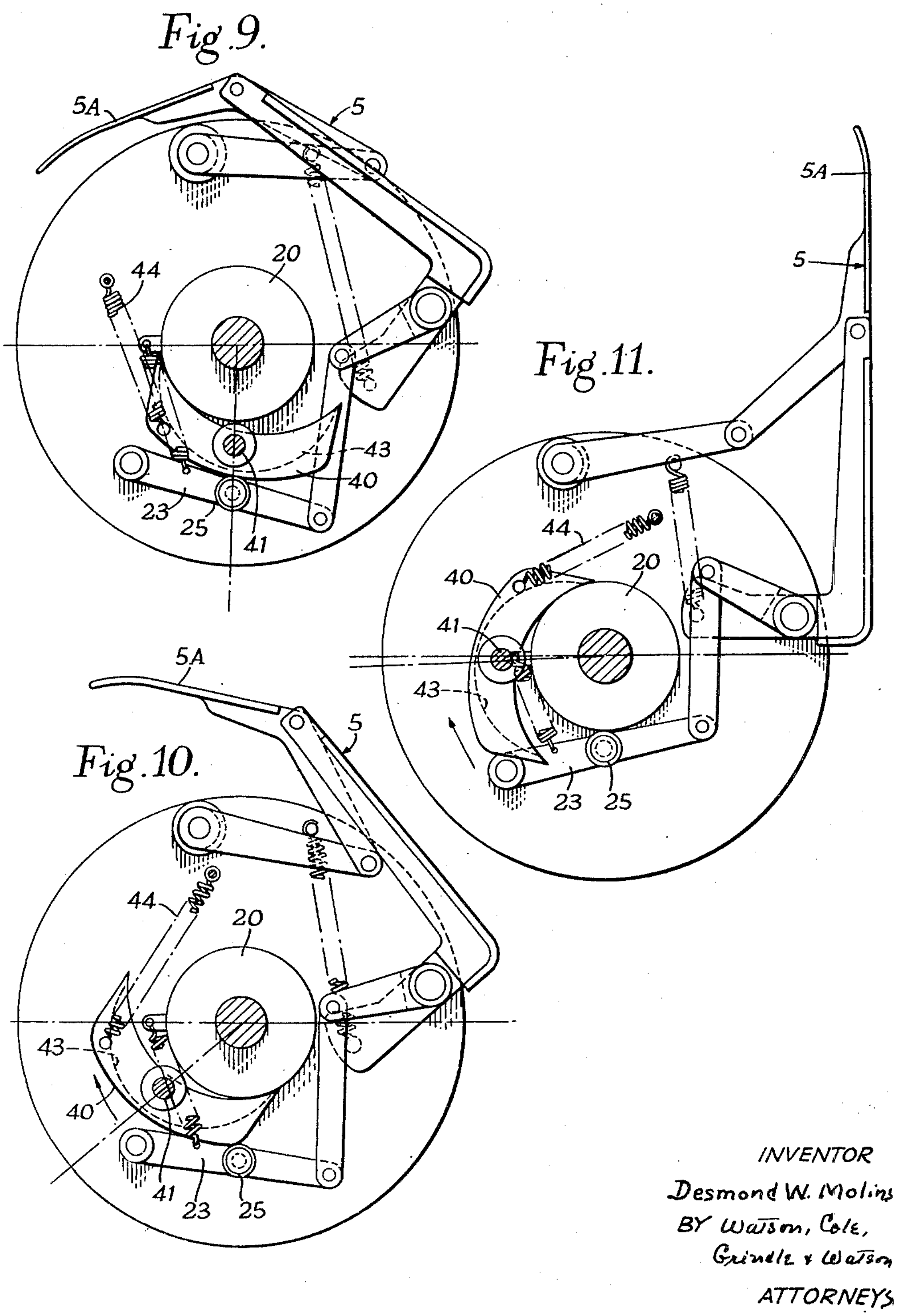
Figures 9, 10 and 11 are views similar to Figure 6, but showing different positions assumed by parts of the mechanism during its operation.

Operation of the lever 23 is effected by a cam piece 40 pivoted at 41 on a stud 42 fixed to the arm 1, the return movement of the lever being by a spring 23A. For the purpose of explaining the operation of the cam 40 more completely, it is shown in three different positions in Figures 9, 10 and 11. In Figure 9 the cam has moved about 92° from the Figure 6, and at this stage the part 5A has moved down to the dotted position in that figure. As will be easily understood from a comparison of Figures 6 and 9 when the arm 1 rotates in the direction of the arrow on Figure 6 the lower edge of the cam piece 40 passes beneath the roller 25, deflecting the lever 23 downwards, see Figure 9, with the effect previously described. After the pivot 41 has passed the roller 25 the cam-piece rotates under the pressure of the roller until after about another 50° of movement the trailing edge of the cam-piece rests on the boss 20, see Figure 10, after which the roller 25 passes from the cam surface, the spring 44 returning the cam piece to its original position relatively to the surface of the boss 20, see Figure 11. As soon as the corner of the cam piece 40 can spring past the roller 25, the lever 23 is returned to the position shown in Figure 6, and the guide 5 is once more vertical. This occurs a few degrees before the end of the swing, namely, about 174° from the initial position. In Figure 11 the cam has passed beyond this position and the arm has rotated 177° from its original position. Naturally as the roller 25 runs down the slope of the cam the guide 5 is rapidly approaching the vertical position so that when 180° of arm movement has been made the guide is positioned to guide cigarettes pouring from the tray when the cover (not shown) of the tray is removed. Upon return of the arm 1, the roller 25 is allowed to pass inside the cam-piece through the recess 43 provided. Thus on the movement of the charger to the discharging position the guide 5 is collapsed, and then rises again to the vertical position to guide the discharged cigarettes, while on the return movement of the arm the guide stays erect and passes through the slot in the side of the empty tray.

What I claim as my invention and desire to secure by Letters Patent is:

1. In apparatus for discharging the contents of cigarette trays into the hopper of a cigarette packing machine, including a pivoted charger for supporting and conveying trays successively to and from a position at which the trays are inverted to discharge the cigarettes from the trays into the hopper, said apparatus comprising, in combination with the pivoted charger, a guide for cigarettes discharged from the trays, means supporting said guide adjacent the pivotal support for the charger, said guide being capable of deflection from a generally erect, cigarette guiding position to an inactive position out of the path of movement of the tray, and means operable in timed relation with said charger for deflecting said guide from one to another of said positions as said charger and a supported tray move into cigarette discharging position.

2. In apparatus for discharging the contents of cigarette trays into the hopper of a cigarette packing machine, including a pivoted charger for supporting and conveying trays successively to and from a position at which the trays are inverted to discharge the cigarettes from the trays into the hopper, said apparatus comprising, in combination with the pivoted charger, a member pivoted adjacent the pivotal support for said charger, said member constituting a guide for cigarettes discharged from the trays, said member being rotatable on its pivot from a generally erect, cigarette guiding position to an inactive position out of the path of movement of the tray, and means operable in timed relation with said charger for rotating said member first into said inactive position to permit the tray to pass to the discharging position, and thereafter into the erect, cigarette guiding position.

3. Apparatus as claimed in claim 2 wherein said means comprises a cam rotatable with the charger arm for effecting rotation of said member, and a spring restoring said member to the erect position.

4. Apparatus as claimed in claim 2 wherein the pivoted member is formed of at least two parts pivoted together and wherein said means effects rotation of each part of its respective pivot.

5. Apparatus as claimed in claim 4 wherein the upper of said two parts is formed to provide a lever which is pivotally connected to a link which is in turn pivoted to a fixed part, said lever and link forming an elbow whose exterior angle is directed toward the pivot of the lower part of the member, whereby when the lower part is rotated on its pivot by the cam the upper part is constrained to swing on its pivot so that its free end moves toward the lower part of the member.

6. Apparatus as claimed in claim 3 wherein said cam is pivoted on said charger, a cam lever coupled to said pivoted member, and a roller on said cam lever, said cam engaging said roller to effect displacement of said lever to said inactive position during movement in one direction of said charger, and passing said roller on its opposite side during reverse movement of said charger.

References Cited in the file of this patent

UNITED STATES PATENTS

| | | |
|---|---|---|
| 1,906,126 | Mott | Apr. 25, 1933 |
| 2,605,909 | Molins et al. | Aug. 5, 1952 |